US008949190B2

(12) United States Patent
Schreter

(10) Patent No.: US 8,949,190 B2
(45) Date of Patent: Feb. 3, 2015

(54) POINT-IN-TIME DATABASE RECOVERY USING LOG HOLES

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/290,876

(22) Filed: Nov. 7, 2011

(65) Prior Publication Data

US 2013/0117233 A1    May 9, 2013

(51) Int. Cl.
*G06F 17/30* (2006.01)
*G06F 7/00* (2006.01)
(52) U.S. Cl.
CPC . *G06F 7/00* (2013.01); *G06F 17/30* (2013.01)
USPC ........................................................ 707/648
(58) Field of Classification Search
USPC ........................................................ 707/648
See application file for complete search history.

(56) References Cited

U.S. PATENT DOCUMENTS

2008/0281865 A1* 11/2008 Price et al. ................ 707/103 Y
2012/0109895 A1*  5/2012 Zwilling et al. ............. 707/648

* cited by examiner

*Primary Examiner* — Hosain Alam
*Assistant Examiner* — Johnese Johnson
(74) *Attorney, Agent, or Firm* — Mintz Levin Cohn Ferris Glovsky and Popeo, P.C.

(57) ABSTRACT

A first plurality of log segments are generated in a data storage application. The log segments are sequentially positioned within a log area and at least one of the log segments contains log hole information identifying a portion of log to skip during replay of the log. Thereafter, a portion of log segments are replayed up to a specified position while skipping at least one portion of the log prior to the specified position that is identified by the at least one log hole. Related apparatus, systems, techniques and articles are also described.

20 Claims, 4 Drawing Sheets

POINT-IN-TIME DATABASE RECOVERY USING LOG HOLES

TECHNICAL FIELD

The subject matter described herein relates to techniques for recovering data from a database at specifically designated points-in-time using log hole information.

BACKGROUND

To achieve data redundancy, database systems store data backups as well as write-ahead log backups in tertiary storage. Even in catastrophic situations, the database can be recovered from backup by using the last data backup and applying operations in backed-up database logs starting from this backup. In cases in which the database log in a log area is still available, it can be possible to recover all data up to the last commit.

Sometimes, a database administrator cannot or does not want to recover all data, but rather wants to recover data up to a specified point in time. This is, for instance, needed if some data was inadvertently removed from the database—the administrator can recover the database up to the time before the data has been removed. The administrator may also need to iteratively find a suitable point-in-time until which data recovery should be performed or, later, a new point-in-time recovery has to be performed and the like. At all times, backup history should not be lost, in order to enable recovery from any past backup.

SUMMARY

In one aspect, a first plurality of log segments are generated in a data storage application. The log segments are sequentially positioned within a log area and at least one of the log segments contains log hole information identifying a portion of log to skip during replay of the log. Thereafter, a portion of log segments are replayed up to a specified position while skipping at least one portion of the log prior to the specified position that is identified by the at least one log hole.

At least one log segment can be generated containing or subsequent to the specified recovery end position such that a first log segment generated after starting or restarting the data storage application identifies a corresponding log hole including at least portion of one log segment containing or generated subsequent to the specified recovery end position. New log segments can be created when a prior log segment becomes full and can be created such that they do not contain the log hole information. The log hole information can be written to a header of a corresponding log segment. The data storage application can store data characterizing each log segment and the log hole information in a log segment directory. Data characterizing each backed-up log segment can be stored in a backup directory. At least one of the log segment directory and the backup directory can be accessed prior to replaying the portion of the log segments up to the specified recovery end position to determine which portions of log prior to the specified recovery end position to replay and which portions of log prior to the specified recovery end position to skip. The data storage application can comprise an in-memory database. Each log segment can include log records which are created in a sequential temporal sequence.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the current described log hole techniques can provide a seamless backup history. As long as data and log backups are available on tertiary media, one can start from any data backup and perform log recovery over any skipped log segments (e.g., areas, records, etc.) that resulted from prior point-in-time recovery. Furthermore, with the current subject matter, point-in-time recovery can be stacked (i.e., after one point-in-time recovery is performed, a next point-in-time recovery to a yet earlier state can be performed, etc.).

Seamless backup history and the resulting shorter downtime in case of point-in-time recovery is also important in distributed databases. With such distributed databases, even simple database restarts after crashes can require point-in-time recovery of individual nodes to reach a globally-consistent transactional state. Without seamless backup history as described herein, a new data backup would have to be performed after each unexpected shutdown of any node of the database (such as a power outage or a crash due to a software bug, etc.).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
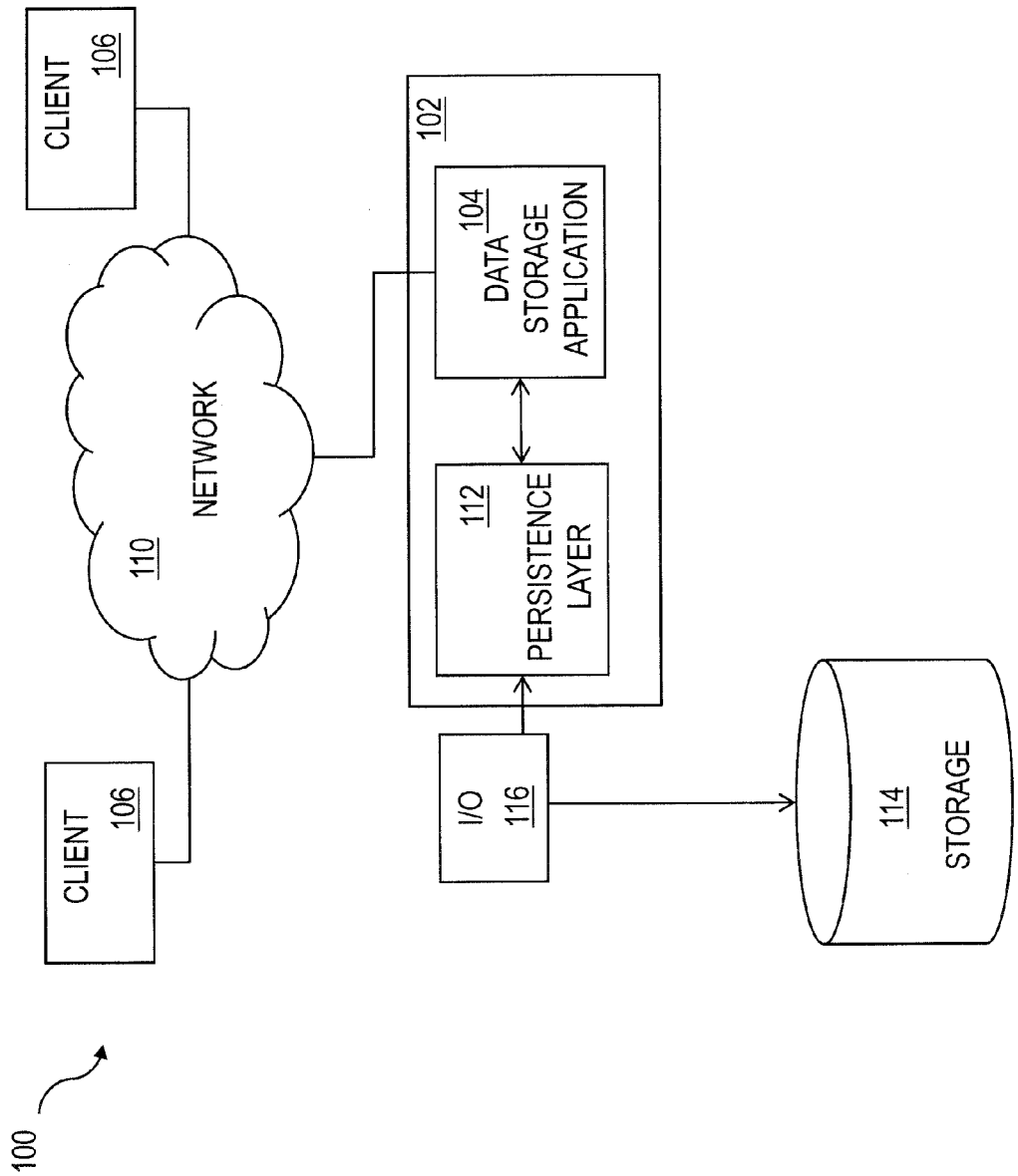
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
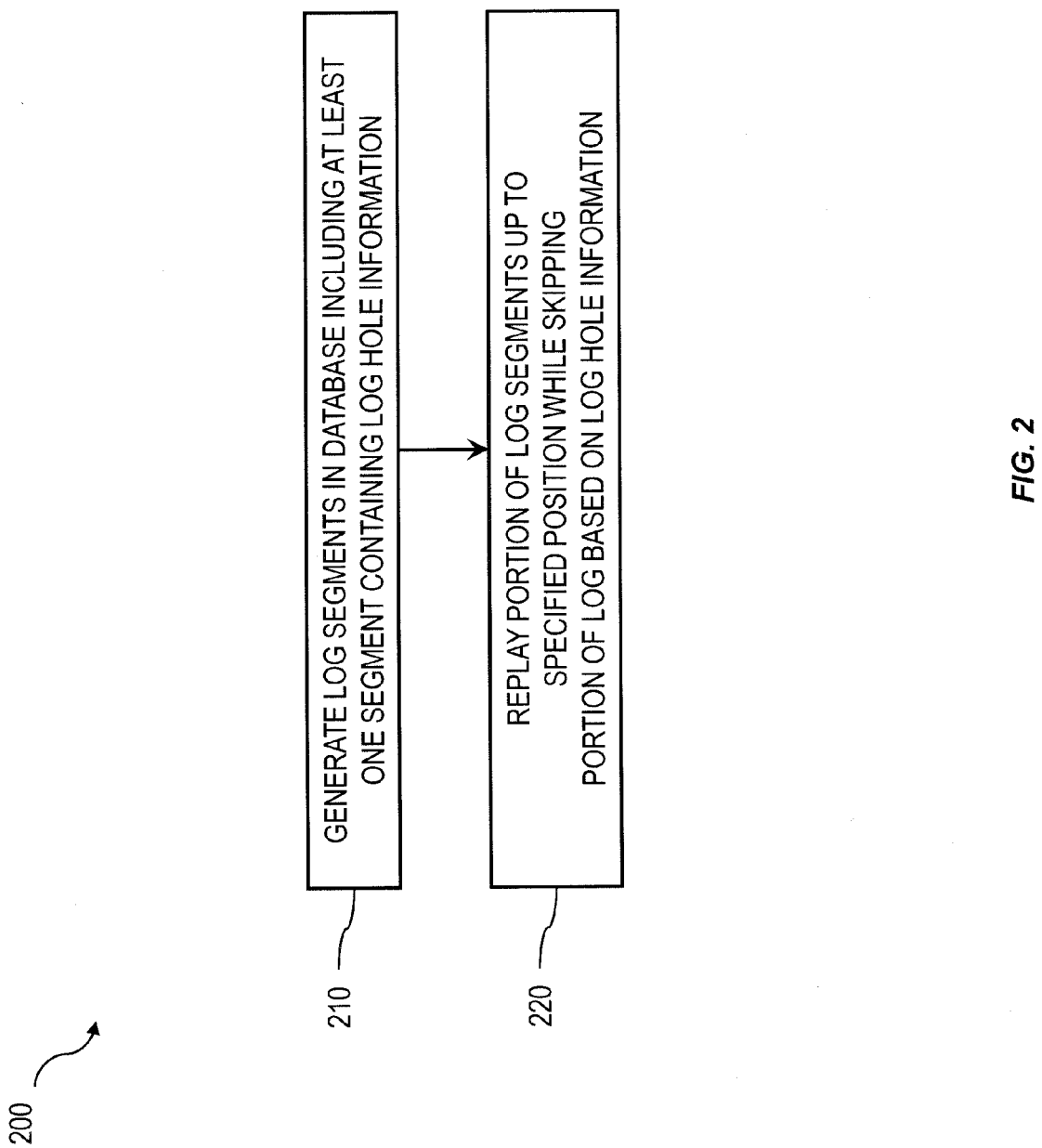
FIG. 2 is a process flow diagram replaying of log segments while skipping a portion of a log hole.

FIG. 2 is a process flow diagram 200 in which, at 210, a first plurality of log segments are generated in a data storage application. The log segments are sequentially positioned within a log and at least one of the log segments contains log hole information identifying a portion of the log to skip during replay of the log. Thereafter, at 220, a portion of the log segments are replayed up to a specified position. The replaying skips the portion of the log prior to the specified position that is identified by the at least one log hole.

Figure 3:
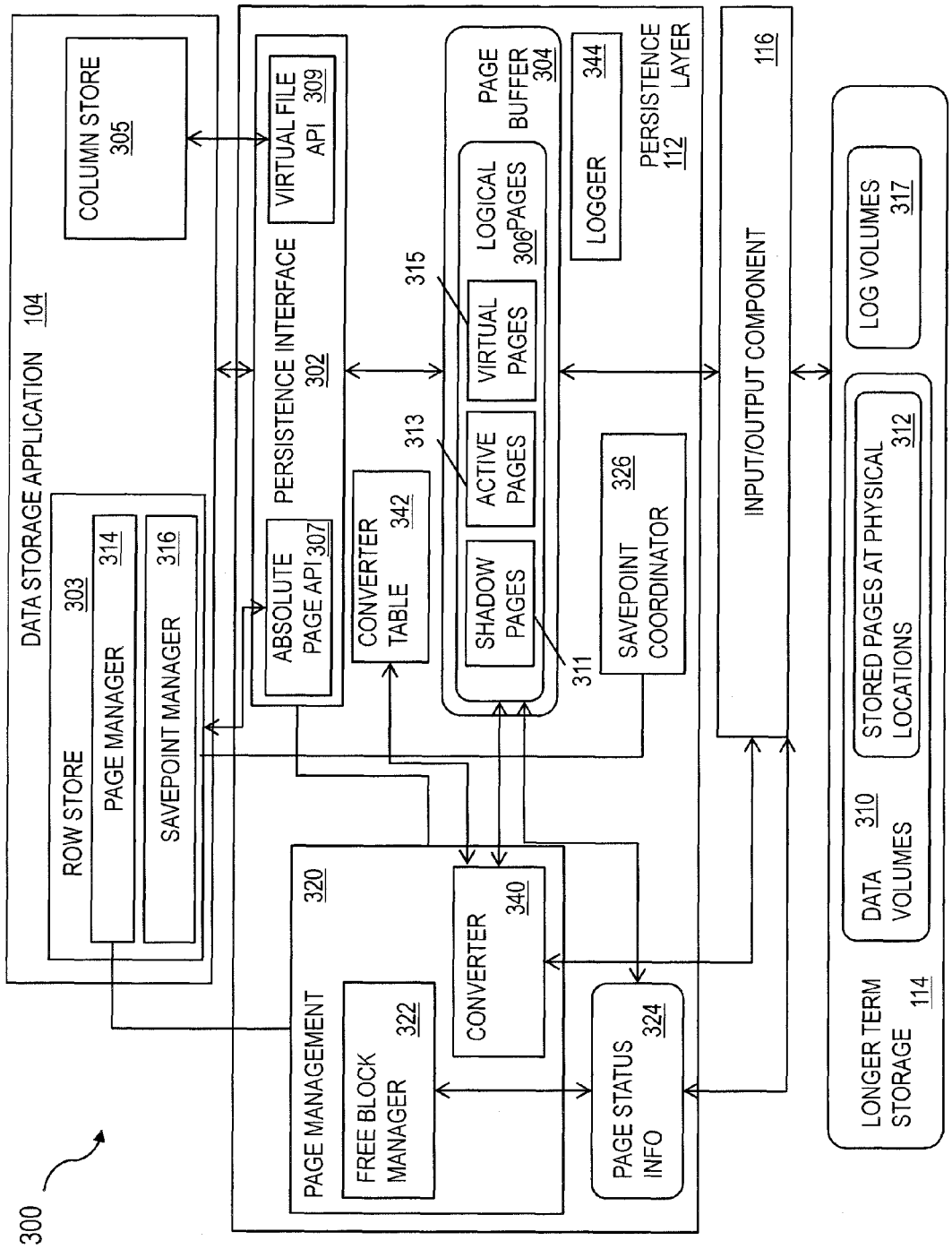
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages 311, active pages 313, data pages of virtual files 315 and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include a row store 303 and a column store 305. The row store 303 can comprise or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash. The row store 303 can access the persistence interface 302 via an absolute page API 307. The column store 305 which can store columns in contiguous memory can access the persistence interface 302 via a virtual file API 309.

In some implementations of a data storage application 104, the page management module of the persistence layer 112 can implement shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes 317 while normal data is written to data volumes 310. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The column store 305 can persist its tables to virtual files provided by the persistence layer 112 via the virtual file API 307. Internally the persistence layer 112 can map a virtual file to a chain of linked pages 315 stored in the page buffer 304. Data belonging to one columnar table can be stored in multiple virtual files: one virtual file per column for a main storage and one virtual file for a delta log. In addition, one virtual file can optionally be stored per column for the main storage of the history part of the table, and/or one virtual file can optionally be stored per table for the delta of the history part of the table. The persistence layer 112 can maintain a directory that stores for each virtual file the start page and additional information such as the size and the type of the virtual file.

Each log record in a database (e.g., the data storage application 104, etc.) can be identified by its log sequence number, such as position in log or the like. Point-in-time recovery as used herein means recovering the database up to some specified position in the log. In some variations, a timestamp can be associated with at least some log positions to facilitate log recovery to a specified absolute time (wall clock). After the recovery is done, new log records are going to be written to the log area. Log hole markers, as described further below, can be used in the log to indicate which portions of the log have been skipped during point-in-time recovery to ensure seamless backup history. Even if a part of the log is skipped due to point-in-time recovery, the log positions in this area are not reused. Instead, new log records will be written at log position subsequent to the skipped portions. Thus, each log position within the database is unique.

At each (re)start of the database, a new log segment can be started (e.g., created, generated, etc.). The header of this log segment can contain the log hole information, which describes, where the hole caused by point-in-time recovery before this log segment starts (if any). New log segments can also be started when the previous log segment is full (in this case, no log hole information is written to the header as there is no log hole).

The information about existing log segments (and their holes) can be kept locally in log area of the database (e.g., log volumes 317, etc.) in a log segment directory, as well as in backup directory, which can describe all backed-up log segments. When the log recovery is attempted, this hole information is known in advance before the recovery proper starts and can be used to determine appropriate recovery strategy (i.e., which log segments to recover at all and which portions of them, etc.).

At recovery time, the administrator can first recover the data area, for example, from a full data backup, and one or more incremental data backups or from a local database snapshot. The recovered data area can contain start position in the log (which can be partitioned into a plurality of log segments), from which the log needs to be applied. Next, the administrator can determine until which point-in-time (specified as log position) the log recovery should run. Normally, this is the latest possible point-in-time, (i.e., end of the log, etc.). Based on log hole information (which can be obtained from log segment headers, the log segment directory and/or the backup directory, etc.), the recovery manager can compute which log parts must be applied in order to reach this log position and the log recovery is done appropriately.

As a side effect, log hole method can be also used to implement a safe "clear log" option. The database can be started from the last savepointed state (or some older transactionally-consistent state, such as data backup or snapshot). Then, "clear log" will effectively mean writing a log hole which encompasses the log area between the start position in log as stored in data area and newest known log position. Log area itself is not touched and we still have possibility of data and log recovery from an earlier backup over this newly-generated log hole or to recover with point-in-time into the hole.

Figure 4:
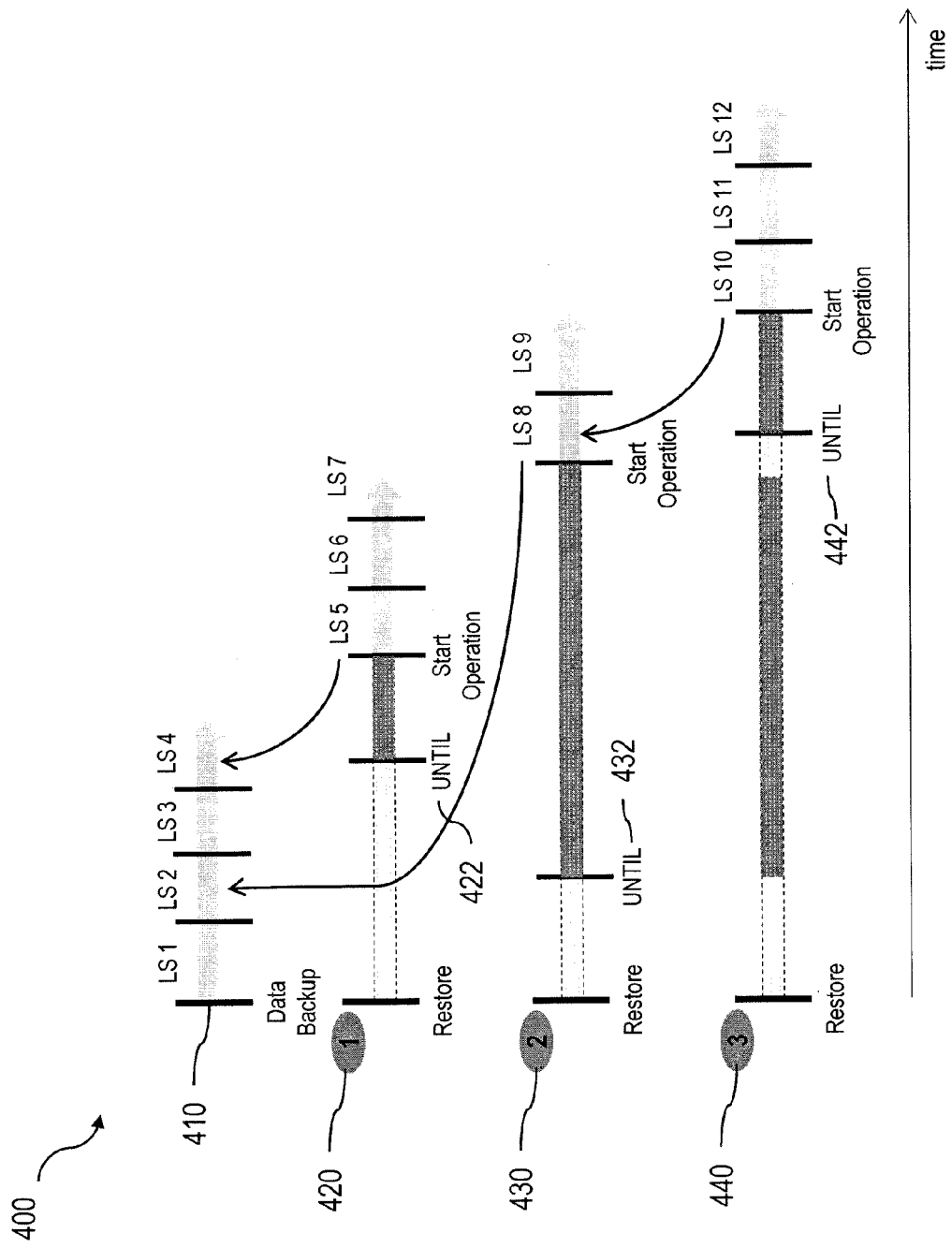
FIG. 4 is a diagram illustrating a plurality of database recovery operations skipping log holes.

FIG. 4 is a diagram 400 illustrated various repeated point-in-time recoveries of a database. Each reference LS1-12 refers to a different log segment which was generated in a sequential (although not necessarily continuous manner). Initially, at 410, a first group of log segments LS1-LS4 is generated subsequent to a data-backup point (i.e., data is fully backed up on permanent storage, etc.). Later, at 420, a first recovery operation is initiated in which the database is replayed up to a first specified end position 422 that is subsequent in the log sequence to LS4. Thereafter, the database is restarted and new log segments LS5-LS7 are generated. In this case, the log hole information pointing into LS4 will be stored in LS5. In LS6-LS7, there is no log hole because no log portions are being skipped.

Subsequently, at 430, a second recovery operation is initiated in which the database is replayed up to a second specified start position 432. The second specified end position 432 lies within LS2. In this scenario, after the database is restarted, log segments LS8-LS9 are generated. LS8 includes log hole information identifying a log hole starting inside of LS2 and which includes log segments LS3-LS7 completely (because such log segments were generated to the second specified end position 422).

A third recovery operation is initiated, at 440, in which the database is replayed up to a third specified end position 442. The third start position 442 lies within log segment LS8 (which was generated as part of the second recovery operation). After the database is restarted, log segment LS10 is created which includes log hole information identifying a log hole starting in LS8 and spanning log segment LS9. In this case, there are two holes recorded (one in LS8, starting within LS2 and spanning log segments LS3-7 and second one starting within LS8 and spanning LS9) which should be skipped during replay (and so the respective log portions are skipped during the fourth recovery operation, which is not depicted).

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
   generating a first plurality of log segments of a log in a data storage application, the log segments being sequentially positioned within a log area, at least one of the log segments containing log hole information indicating which portions of the log were skipped during point-in-time recovery;
   replaying a portion of the log segments up to a specified position, the replaying skipping at least one portion of the log prior to the specified position that is indicated by the log hole information as having been skipped during point-in-time recovery; and
   writing subsequent log segments at positions subsequent to the at least one portion skipped ruing the replaying, wherein each subsequent log segment comprises a header describing the log information.

2. A non-transitory computer program product as in claim 1, wherein at least one log segment was generated containing or subsequent to the specified recovery end position, and wherein a first log segment generated after starting or restarting the data storage application identifies a corresponding log hole including at least portion of one log segment containing or generated subsequent to the specified recovery end position.

3. A non-transitory computer program product as in claim 1, wherein new log segments are created when a prior log segment becomes full and wherein such new created log segments do not contain the log hole information.

4. A non-transitory computer program product as in claim 1, wherein the log hole information is written to a header of a corresponding log segment.

5. A non-transitory computer program product as in claim 1, wherein the operations further comprise:
   storing, by the data storage application, data characterizing each log segment and the log hole information in a log segment directory.

6. A non-transitory computer program product as in claim 5, wherein the operations further comprise:
   storing, by the data storage application, data characterizing each backed-up log segment in a backup directory.

7. A non-transitory computer program product as in claim 6, wherein the operations further comprise:
   accessing at least one of the log segment directory and the backup directory prior to replaying the portion of the log segments up to the specified recovery end position to determine which portions of log prior to the specified recovery end position to replay and which portions of log prior to the specified recovery end position to skip.

8. A non-transitory computer program product as in claim 1, wherein the data storage application comprises an in-memory database.

9. A non-transitory computer program product as in claim 1, wherein each log segment comprises log records which are created in a sequential temporal sequence.

10. A method comprising:
  generating a first plurality of log segments in a data storage application, the log segments being sequentially positioned within a log area, at least one of the log segments containing log hole information indicating which portions of the log were skipped during point-in-time recovery;
  replaying a portion of the log segments up to a specified position, the replaying skipping at least one portion of log prior to the specified position that is indicated by the log hole information as having been skipped during point-in-time recovery; and
  writing subsequent log segments at positions subsequent to the at least one portion skipped ruing the replaying, wherein each subsequent log segment comprises a header describing the log information.

11. A method as in claim 10, wherein at least one log segment was generated containing or subsequent to the specified recovery end position, and wherein a first log segment generated after starting or restarting the data storage application identifies a corresponding log hole including at least portion of one log segment containing or generated subsequent to the specified recovery end position.

12. A method as in claim 10, wherein new log segments are created when a prior log segment becomes full and wherein such new created log segments do not contain the log hole information.

13. A method as in claim 10, wherein the log hole information is written to a header of a corresponding log segment.

14. A method as in claim 10, further comprising:
  storing, by the data storage application, data characterizing each log segment and the log hole information in a log segment directory.

15. A method as in claim 14, further comprising:
  storing, by the data storage application, data characterizing each backed-up log segment in a backup directory.

16. A method as in claim 15, further comprising:
  accessing at least one of the log segment directory and the backup directory prior to replaying the portion of the log segments up to the specified recovery end position to determine which portions of log prior to the specified recovery end position to replay and which portions of log prior to the specified recovery end position to skip.

17. A method as in claim 10, wherein the data storage application comprises an in-memory database.

18. A method as in claim 10, wherein each log segment comprises log records which are created in a sequential temporal sequence.

19. A system comprising:
  at least one programmable processor; and
  memory coupled to the at least one programmable processor, the memory storing instructions, which when executed, cause the at least one programmable processor to perform operations comprising:
  generating a first plurality of log segments in a data storage application, the log segments being sequentially positioned within a log area, at least one of the log segments comprising log hole information indicating which portions of the log were skipped during point-in-time recovery in a header portion of the corresponding log segment;
  replaying a portion of the log segments up to a specified position, the replaying skipping at least one portion of log prior to the specified position that indicated by the log hole information as having been skipped during point-in-time recovery; and
  writing subsequent log segments at positions subsequent to the at least one portion skipped ruing the replaying, wherein each subsequent log segment comprises a header describing the log information;
  wherein:
    at least one log segment was generated containing or subsequent to the specified recovery end position,
    a first log segment generated after starting or restarting the data storage application identifies a corresponding log hole including at least portion of one log segment containing or generated subsequent to the specified recovery end position, and
    new log segments are created when a prior log segment becomes full and such new created log segments do not contain the log hole information.

20. A non-transitory computer program product as in claim 1, wherein new log segments are started when a previous log segment becomes full.

* * * * *